United States Patent [19]

Henn et al.

[11] 3,794,974

[45] Feb. 26, 1974

[54] DIGITAL FLOW PROCESSOR

[75] Inventors: William Henn, Lexington; Richard Serwetman, Medford, both of Mass.

[73] Assignee: Raytheon Company, Lexington, Mass.

[22] Filed: Oct. 13, 1972

[21] Appl. No.: 297,534

[52] U.S. Cl........... 340/146.2, 235/61.7 R, 235/177 328/37

[51] Int. Cl...........................................G06f 7/02

[58] Field of Search.... 340/146.2; 235/92 CA, 61.7, 235/176, 177; 343/5 DP, 17.1

[56] References Cited

UNITED STATES PATENTS

| | | | |
|---|---|---|---|
| 2,844,309 | 7/1958 | Ayres | 235/177 |
| 3,636,519 | 1/1972 | Heath | 340/172.5 |
| 3,201,758 | 8/1965 | Pouliart et al. | 235/61.7 |

OTHER PUBLICATIONS

J. H. Green, Jr. & R. L. San Soucie; "An Error-Correcting Encoder and Decoder of High Efficiency"; Proceedings of the IRE: Oct. 1958; pp. 1741–1744.

*Primary Examiner*—Eugene G. Botz
*Assistant Examiner*—Errol A. Krass
*Attorney, Agent, or Firm*—Richard M. Sharkansky; Philip J. McFarland; Joseph D. Pannone

[57] ABSTRACT

An apparatus is disclosed for determining the maximum (or minimum) of a group of the most recent digital numbers sequentially applied thereto. The apparatus includes a first register $R_1$, having a number of storage stages. The first register is coupled to a source of the digital numbers. The number of storage stages in such first register is equal to the next integer greater than half the desired number, N, of samples in the group. Each one of a number of succeeding registers, $R_2$-$R_n$, is connected to its preceding register by a comparator means. The inputs of such comparator means are connected to the first and last storage stage in such preceding register. The number of storage stages in each succeeding register, $R_2$-$R_n$, is equal to one plus the next integer greater than $(N-2^{N-1})/2^n$ where n is the number of the register.

3 Claims, 1 Drawing Figure

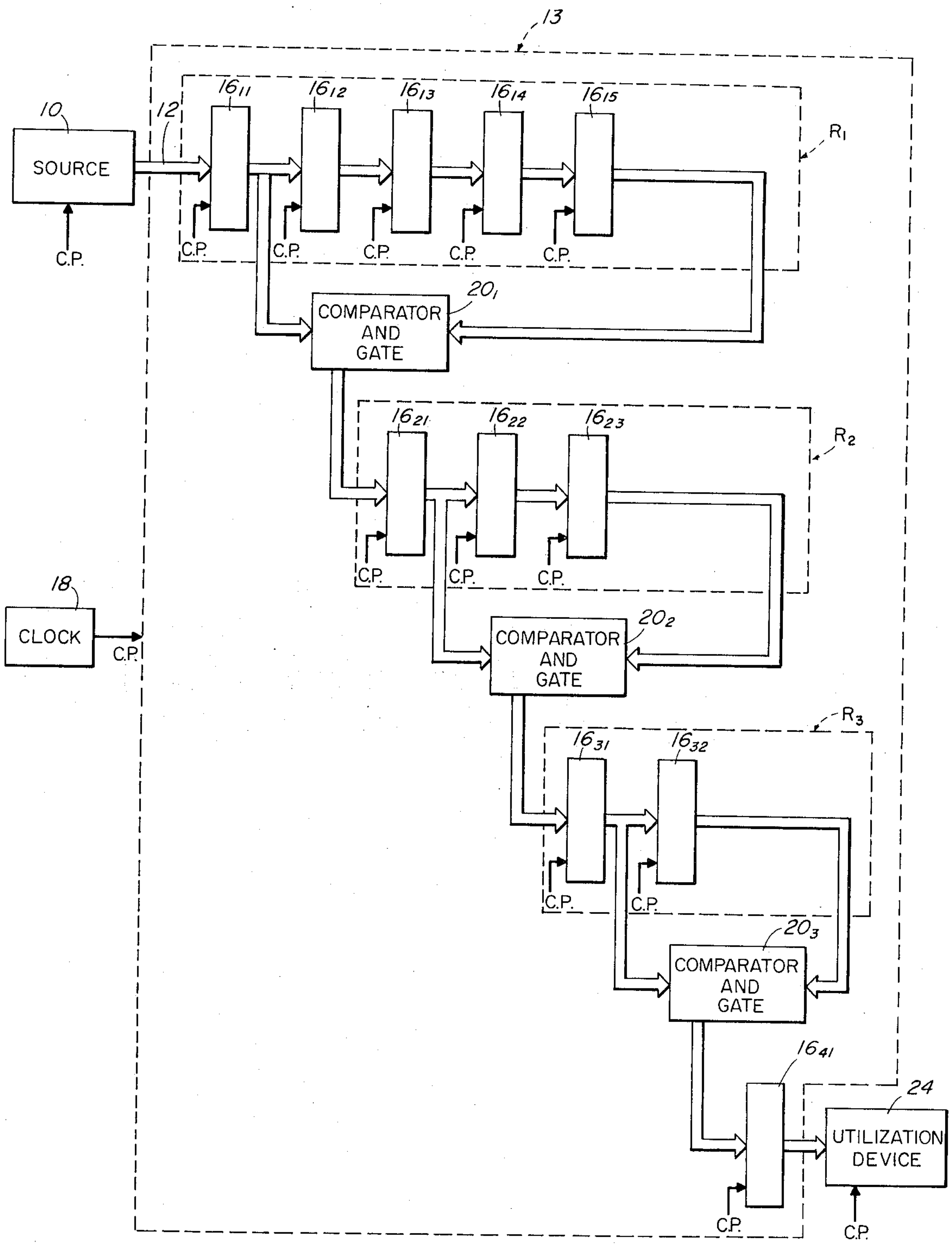
13
10
SOURCE
12
$16_{11}$
$16_{12}$
$16_{13}$
$16_{14}$
$16_{15}$
$R_1$
C.P.
$20_1$
COMPARATOR AND GATE
$16_{21}$
$16_{22}$
$16_{23}$
$R_2$
18
CLOCK
$20_2$
$R_3$
$16_{31}$
$16_{32}$
$20_3$
$16_{41}$
24
UTILIZATION DEVICE

DIGITAL FLOW PROCESSOR

The invention herein described was made in the course of or under a contract or subcontract thereunder, with the Department of Defense.

BACKGROUND OF THE INVENTION

The invention relates generally to digital flow processing apparatus and more particularly to such apparatus wherein the maximum (or minimum) of a group of the most recent digital numbers sequentially applied to such apparatus is determined.

In a radar system wherein digital flow (or pipe-line) processing is used it is known that normalization of the radar return signal is generally required. However, prior to such normalization it has been found desirable to remove from the train of digitized video signal samples the maximum in a group of samples. One known apparatus adapted to determine such maximum includes a number of registers. The first of such registers has its input storage stage coupled to the train of samples. Each sample is shifted through the storage stages of the register at the sampleing rate. The number of storage stages in the first register is equal to the desired number of samples in the group. The first register is coupled to a second register. The data in such register is also shifted at the sampling rate. The number of storage stages in such second register is half the number of storage stages in the first register. A number of comparator means (equal to the number of storage stages in the second register) couple each one of the storage stages in the second register to a corresponding pair of storage stages of the first register. The pair of input terminals of each one of such comparator means is coupled to a corresponding pair of consecutively coupled storage stages in the first register. The output terminal of each one of such comparator means is coupled to a corresponding storage stage of the second register. The number of storage stages in each one of the next succeeding regisers as well as the number of comparator means coupling each one of the succeeding registers is reduced to one-half the number of storage stages in the preceding register set. The last (or output) register serves as the output of the apparatus. Such output register contains the maximum in the group of samples. It will be apparent that, if the desired number of samples in the group is 64, then registers having a total of 127 storage stages and 63 comparator means are required for the above described apparatus. Obvioulsy it is desirable to reduce the number of registers, storage stages thereof and comparators required in an apparatus having the above described functions.

SUMMARY OF THE INVENTION

With the background of the invention in mind, it is an object of this invention to provide an apparatus for determining the maximum of a group of the most recent digital numbers sequentially applied thereto, such apparatus having fewer components than has been known heretofore.

This and other objects of the invention are attained generally by providing a plurality of registers $R_1$-$R_n$, the first register $R_1$ thereof being coupled to the train of samples. Each one of a number of succeeding registers is coupled to the preceding register by a different comparator means. The pair of inputs of such comparator means is coupled to the first and last storage stage in such preceding register. The first and last storage stage have at least one storage stage coupled therebetween. The number of storage stages in the first register $R_1$ is equal to the next integer greater than one-half the desired number N of samples in the group and the number of storage stages in each succeeding register $R_2$-$R_n$ is equal to one plus the next integer greater than $(N-2^{n-1}/2^n)$ where n is the number of the register.

BRIEF DESCRIPTION OF THE DRAWINGS

The above-mentioned and other objects and features of this invention will become more readily apparent when considered with reference to the following description taken in conjunction with the accompanying drawing, in which the FIGURE shows a block diagram of an apparatus according to the invention.

DESCRIPTION OF THE PREFERRED EMBODIMENT

Referring now to the FIGURE, a source 10 supplies a train of digital samples on bus line 12 at a desired sampling rate to an apparatus 13. Apparatus 13 is here arranged, in a manner to be described, for determining the maximum sample in a group of the current eight most recent samples applied thereto. It is here mentioned that apparatus 13 may be modified in a manner to be described, to determine the maximum in any desired number of samples in the group and further may be modified to provide the minimum of such desired number of samples.

Apparatus 13 is comprised of a first (or input) register, $R_1$, having storage stages $16_{11}$ - $16_{15}$. The input storage stage $16_{11}$ is connected to bus line 12. The storage stages $16_{11}$ - $16_{15}$ are each adapted to store a desired number of bits, say *n*, comprising each one of the samples. Each one of the bits in each storage stage couples to a corresponding bit in the succeeding storage stage in what is commonly referred to as parallel digital data processing. A clocking means 18 produces clock pulses, c.p., at the data sampling rate. Such clock pulses are applied to each one of the storage stages $16_{11}$ - $16_{15}$. It follows then that in response to each one of the clock pulses, c.p., each sample on data bus line 12 is stored in storage stage $16_{11}$ and, in response to succeeding clock pulses becomes shifted to the succeeding storage stage $16_{12}$. Consequently, at the end of the 5th clock pulse each one of the storage stages $16_{11}$ - $16_{15}$ contains a different one of the most recent five samples.

A comparator and gating means $20_1$ has its pair of input terminals connected to the outputs of storage stages $16_{11}$ and $16_{15}$ as shown. Such comparator and gating means $20_1$ is of conventional design (here adapted for *n* bit parallel processing) and produces as its output an *n* bit binary signal equal to the larger of the samples in storage stages $16_{11}$ and $16_{15}$.

The output of the comparator and gating means $20_1$ is connected to a second register, $R_2$, of storage stages $16_{21}$ - $16_{23}$. The second register of storage stages is connected, as shown, in a manner similar to that described for storage stages $16_{11}$ - $16_{15}$. It follows then that when a clock pulse c.p. is applied to the registers $R_1$, $R_2$ after the first register $R_1$ has become full (i.e., the sixth clock pulse), a sixth one of the train of samples appears in storage stage $16_{11}$ and the greater of the first sample and the fifth sample appears in storage stage $16_{21}$.

It follows then that on the seventh clock pulse the greater of the second and sixth samples appears in storage stage $16_{21}$ and the greater of the first and fifth samples is shifted to storage stage $16_{22}$. Further, on the eighth clock pulse, storage stage $16_{21}$ contains the greater of the third and seventh samples; storage stage $16_{22}$ contains the greater of the second and sixth samples; and storage stage $16_{23}$ contains the greater of the first and fifth samples.

A third register, $R_3$, of serially connected storage stages $16_{31}$ - $16_{32}$ is provided and, in like manner, the input storage stage thereof (i.e., storage stage $16_{31}$) is connected to the output of comparator and gating means $20_2$. Such comparator and gating means has its inputs connected to the outputs of storage stages $16_{21}$ and $16_{23}$ as shown. Therefore, in a manner similar to that described above, the comparator and gating means $20_2$ produce a signal which is equal to the greater of the samples in storage stages $16_{21}$ and $16_{23}$. Consequently, on the ninth clock pulse, storage stage $16_{31}$ has stored therein the greater of the first, fifth, third and seventh samples; that is the greatest of the odd samples in the first eight samples. Further, on the tenth clock pulse storage stage $16_{31}$ contains the greatest of the second, forth, sixth and eighth samples (i.e., the greatest of the even samples in the first eight samples), the greatest of the odd samples in the first eight samples being then shifted to storage stage $16_{32}$.

A register $16_{41}$ (i.e., an output register) is similarly connected to the storage stages $16_{31}$, $16_{32}$ of register $R_3$ by a comparator and gating means $20_3$, as shown. Consequently, on the eleventh clock pulse the maximum of the first eight samples becomes stored in register $16_{41}$. (Such output is coupled to conventional utilization device 24, here a display; however, such device 24 may be replaced by additional desired processing equipment.) A little thought will make it apparent therefore that at each succeeding clock pulse register $16_{41}$ will have stored therein the largest of the next most recent eight samples applied to apparatus 13. That is, for example, on the twelfth clock pulse register $16_{41}$ will have stored therein the maximum of the second through ninth samples.

Having described an apparatus for determining the maximum in the current input most recent samples applied thereto it is here noted that the following general rules describe construction of an apparatus for determining the maximum of any desired number of most recent samples: (1) the number of stages in the first register, $R_1$, is equal to the next integer greater than one-half the desired number, N, of samples in a group; and, (2) the number of storage stages in each one of a number of succeeding registers $R_2$–$R_n$ is equal to one plus the next integer greater than $N–2^{n-1}/2^n$, where $n$ is the number of the register. For example, if the desired number, N, of samples in the group is 32, the first register, $R_1$, ($n$=1), would include 17 storage stages, the second register, $R_2$, ($n$=2), would include nine storage stages, the third register, $R_3$, ($n$=3), would include five storage stages, the fourth register, $R_4$, ($n$=4), would include three storage stages, and the fifth register, $R_5$, ($n$=5), would include two storage stages followed by an output register.

It should now be apparent to those having ordinary skill in the art that many modifications may be made to the apparatus described without departing from the inventive concepts thereof. For example, if the minimum is desired each one of the comparator and gating means would be designed to produce at its output the smaller of the two samples applied to its input. It is felt, therefore, that the invention should not be restricted to the proposed embodiments, but rather to the spirit and scope of the following claims.

What is claimed is:

1. In an apparatus for determining the extreme of a desired number, N, of the most recent samples applied thereto, the combination comprising:

a. a first plurality of storage stages, the input storage stage thereof being coupled to the samples and separated from the last storage stage thereof by at least one intermediate storage stage, the number of storage stages being equal to the next integer greater than N/2; and b. a comparator means having its input terminals coupled to the input storage stage and the last storage stage for responding in accordance with the relative magnitude between the samples stored in the input storage stage and the last storage stage.

2. The combination recited in claim 1 including additionally a second plurality of serially coupled storage stages, the number of such storage stages being equal to one plus the next integer greater than $N–2/4$, the input storage stage thereof being coupled to the output of the comparator means.

3. In an apparatus for determining the extreme of a desired number N of the most recent samples applied thereto, the combination comprising:

a. a first register, $R_1$, coupled to the source of samples, such register having a number of storage stages equal to the next integer greater than N/2, the first and last storage stage thereof being separated by an intermediate storage stage;

b. a plurality of succeeding registers, $R_2$-$R_n$, the number of storage stages in each one of the plurality of succeeding registers being equal to one plus the next integer greater than $N–2^{n-1}/2^n$ where n is the number of the register; and c. a plurality of comparator means, each one thereof having its output connected to the first storage stage of one of the succeeding registers and its inputs connected to the first and last storage stage of the preceding register.

* * * * *